(12) United States Patent
Fan et al.

(10) Patent No.: US 8,254,130 B2
(45) Date of Patent: Aug. 28, 2012

(54) COMPUTER SYSTEM

(75) Inventors: Chen-Lu Fan, Taipei Hsien (TW);
Li-Ping Chen, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 483 days.

(21) Appl. No.: 12/580,312

(22) Filed: Oct. 16, 2009

(65) Prior Publication Data

US 2010/0328880 A1 Dec. 30, 2010

(30) Foreign Application Priority Data

Jun. 29, 2009 (CN) .......................... 2009 1 0303729

(51) Int. Cl.
*H05K 7/20* (2006.01)

(52) U.S. Cl. ..................... 361/724; 361/728; 312/223.1; 312/223.2

(58) Field of Classification Search ............. 361/679.32, 361/724
See application file for complete search history.

(56) References Cited

U.S. PATENT DOCUMENTS

| | | | | |
|---|---|---|---|---|
| 4,745,524 | A * | 5/1988 | Patton, III | 361/679.32 |
| 5,338,214 | A * | 8/1994 | Steffes et al. | 439/160 |
| 5,438,476 | A * | 8/1995 | Steffes | 361/679.32 |
| 5,513,329 | A * | 4/1996 | Pecone | 710/301 |
| 5,544,006 | A * | 8/1996 | Radloff et al. | 361/679.32 |
| 5,793,616 | A * | 8/1998 | Aubuchon et al. | 361/784 |
| 5,831,821 | A * | 11/1998 | Scholder et al. | 361/679.32 |
| 6,033,254 | A * | 3/2000 | Neal et al. | 439/377 |
| 6,504,725 | B1 * | 1/2003 | Lam | 361/785 |
| 7,381,081 | B2 * | 6/2008 | Zhang et al. | 439/377 |
| 7,619,885 | B2 * | 11/2009 | Lin | 361/690 |
| 7,626,830 | B2 * | 12/2009 | Fan et al. | 361/801 |
| 7,817,433 | B2 * | 10/2010 | Wu et al. | 361/747 |
| 2005/0122703 | A1 * | 6/2005 | Fan et al. | 361/801 |
| 2006/0044767 | A1 * | 3/2006 | Wu et al. | 361/725 |
| 2008/0165488 | A1 * | 7/2008 | Tsorng et al. | 361/683 |

* cited by examiner

*Primary Examiner* — Anthony Q Edwards
(74) *Attorney, Agent, or Firm* — Altis Law Group, Inc.

(57) ABSTRACT

A computer system is provided. The computer system includes a chassis, a motherboard secured in the chassis, and a mounting bracket. A connector is arranged on the motherboard, and a riser card is inserted in the connector. The mounting bracket is secured to the chassis and located above the motherboard. The computer system further includes a positioning member attached to the riser card. The positioning member has two opposite side plates. One of the side plates is secured to the second riser card, and the other side plate is secured to the mounting bracket.

19 Claims, 5 Drawing Sheets

COMPUTER SYSTEM

BACKGROUND

1. Technical Field

The present disclosure relates to computer systems, and particularly, to a computer system capable of mounting different types of expansion cards.

2. Description of Related Art

Generally, a computer system includes a motherboard, a power source and other components mounted within a chassis. The motherboard typically includes a number of connectors or slots in which special purpose printed circuit boards may be inserted. The special purpose printed circuit boards are often referred to as peripheral component interface (PCI) bus cards or expansion cards. These expansion cards may be used to add to or enhance the functionality of the computer system. The inserted card typically extends perpendicularly from the motherboard. However, if the height of the card is greater than the height limitation of the computer system chassis, there will not be enough room to secure the card within the computer system cabinet. In cases like this, it can be desirable to locate the cards parallel to the motherboard, rather than in the typical perpendicular alignment. Generally, the expansion card is perpendicularly coupled to a transfer card, and then the transfer card is perpendicularly inserted in the connectors on the motherboard, so as to locate the expansion card parallel to the motherboard. The computer system includes a mounting bracket secured to the computer system chassis. The transfer card and the expansion card are securely mounted in the computer system cabinet via the mounting bracket. However, a conventional mounting bracket only can fit one type of expansion card. If another type of expansion card with a different configuration is wanted, a different mounting bracket must be used.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
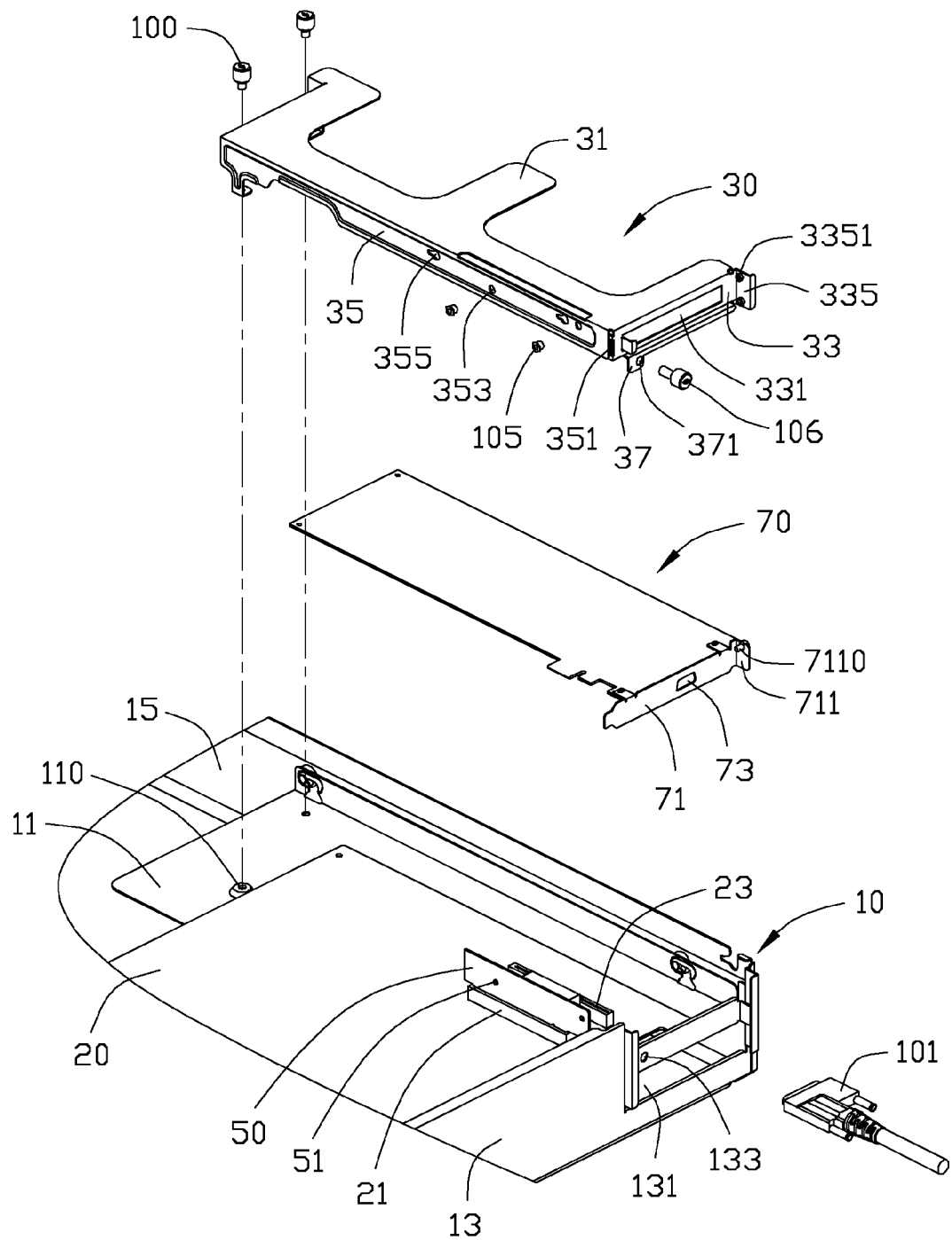
FIG. 1 is an exploded, cutaway, isometric view of a computer system in accordance with one embodiment with a first riser card and a first expansion card.
Figure 3:
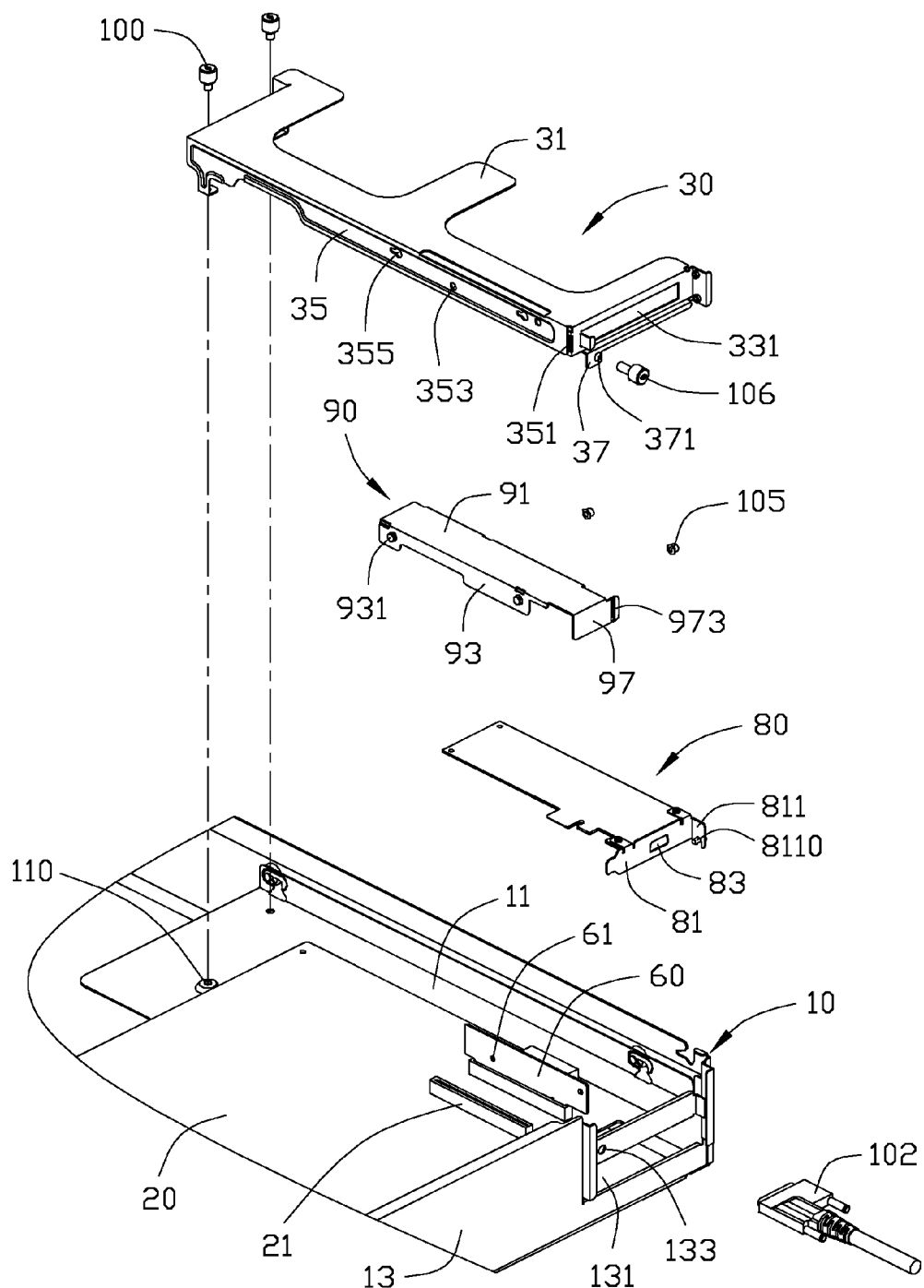
FIG. 3 is an exploded, cutaway, isometric view of the computer system of FIG. 1 with a second riser card, a second expansion card, and a positioning member.
Figure 4:
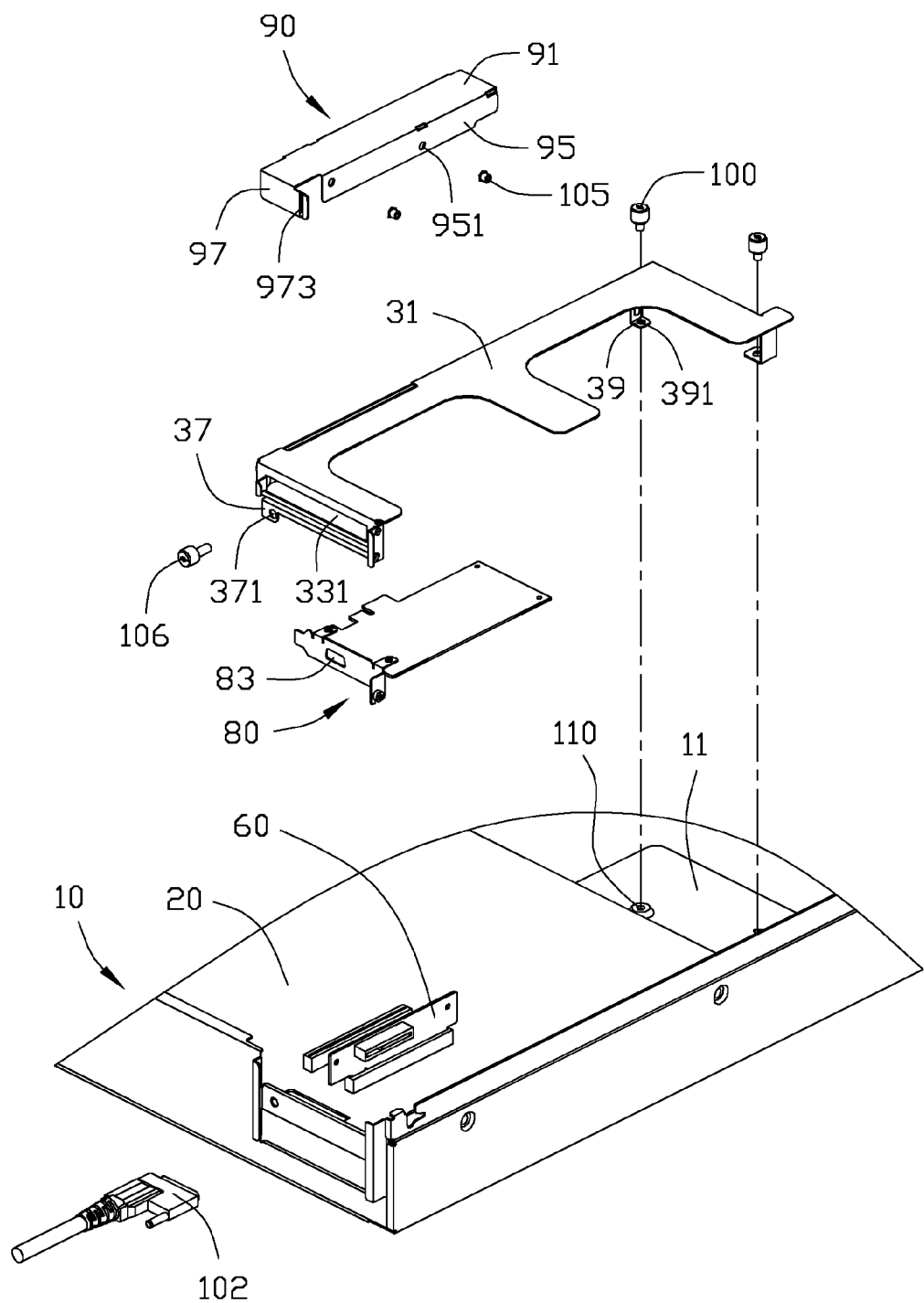
FIG. 4 is similar to FIG. 3, but viewed from another aspect.

Referring to FIGS. 1, 3 and 4, an embodiment of a computer system includes a chassis 10 and a mounting bracket 30.

The chassis 10 includes a bottom wall 11, a front wall 13, and a chassis sidewall 15. The bottom wall 11 defines two securing holes 110. A motherboard 20 is secured on the bottom wall 11 adjacent to the front wall 13 and the chassis sidewall 15. A first connector 21 and a second connector 23 are disposed on the motherboard 20. The first connector 21 and the second connector 23 are aligned in a row parallel to the front wall 13. The first connector 21 is located further away from the chassis sidewall 15 than the second connector 23. The first connector 21 is configured to couple to a first riser card 50, and the second connector 23 is configured to couple to a second riser card. The first riser card 50 defines two securing holes 51. The second riser card 60 defines two securing holes 61. The front wall 13 defines an opening 131 and a securing hole 133.

The mounting bracket 30 includes a substantially E-shaped base 31, a mounting bracket sidewall 33 perpendicularly bent from the base 31, and a securing plate 35 adjacent to the base 31 and the sidewall 33. The sidewall 33 defines an expansion slot 331 corresponding to the opening 131 of the chassis front wall 13. A blocking tab 335 perpendicular to the base 31 and the sidewall 33 extends from one end of the sidewall 33. Two securing posts 3351 protrude from the blocking tab 335. A securing tab 37 extends down from a bottom edge of the sidewall 33. A securing hole 371 is defined in the securing tab 37 corresponding to the chassis front wall securing hole 133. Two standoffs 39 extend from one end of the mounting bracket base 31 opposite to the sidewall 33. Each standoff 39 defines a standoff securing hole 391 corresponding to the chassis bottom wall securing hole 110. The securing plate 35 defines two securing plate securing holes 353 corresponding to the first riser card securing holes 51 and two securing slots 355. A mounting slot 351 is defined in the securing plate 35 adjacent to the sidewall 33. In assembly, the mounting bracket 30 is capable of being mounted on the chassis 10 via a plurality of fasteners 100, 106 respectively engaging the corresponding securing holes 371, 391 in the mounting bracket 30 and the securing holes 110 and 133 in the chassis 10.

The computer system further comprises a first expansion card 70, capable of electronically engaging with the first riser card 50, and a second expansion card 80, capable of coupling with the second riser card 60. A width of the first expansion card 70 is greater than a width of the second expansion card 80. A first fixing piece 71 is secured to one side of the first expansion card 70. The first fixing piece 71 includes a bent tab 711 capable of abutting the mounting bracket blocking tab 335. A securing means 7110, such as a columnar protrusion, is located on the bent tab 711 corresponding to one of the securing posts 3351 on the mounting bracket blocking tab 335. A first port 73 is defined in the first expansion card 70, and is configured to communicate with a peripheral device 101. As shown in FIG. 3, a second fixing piece 81 is secured to one side of the second expansion card 80. The second fixing piece 81 includes a bent tab 811 capable of abutting the mounting bracket blocking tab 335. A securing means 8110, such as a bolt is formed on the bent tab 811 corresponding to the other securing post 3351 on the mounting bracket blocking tab 335. A second port 83 is defined in the first expansion card 80, and is configured to communicate with a peripheral device 101.

The computer system further includes a positioning member 90 capable of being coupled to the second riser card 60. The positioning member 90 includes a top wall 91, a first side plate 93 and a second side plate 95 opposite to the first side plate 93. Two securing protrusions 931 are formed on the first side plate 93 corresponding to the securing slots 355 in the mounting bracket 30. The second side plate 95 defines two securing slots 951 corresponding to the second riser card securing slots 61. A third plate 97 adjacent to the first side plate 93 and the second plate 95 is bent from one end of the top wall 91. A mounting slot 973 is defined in the third plate 97.

When in use, one of the first riser card 50, with the first expansion card 70, and the second riser card 60, with the second expansion card 80, is selected to be mounted in the chassis 10.

Figure 2:
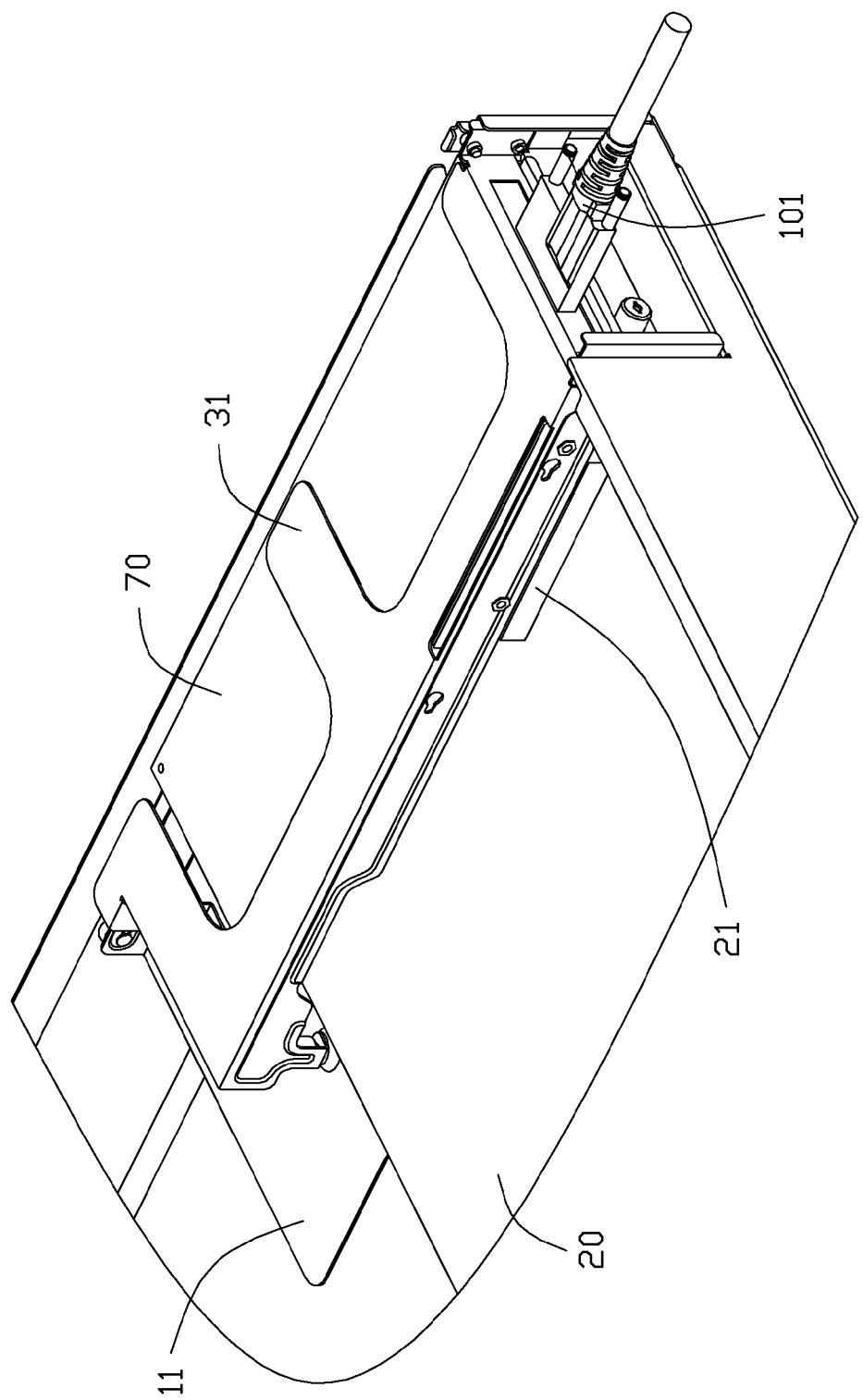
FIG. 2 is an assembled view of FIG. 1.

Referring to FIG. 2, when the first riser card 50 with the first expansion card 70 is selected for mounting in the chassis 10, the first riser card 50 is perpendicularly inserted in the first connector 21 on the motherboard 20. The first expansion card 70 is perpendicularly coupled to the first riser card 50 parallel to the motherboard 20. The securing plate 35 of the mounting bracket 30 abuts the first riser card 50. Two fasteners 105 extend through the first riser card securing holes 51 and the mounting bracket securing holes 353 to secure the first riser card 50 to the mounting bracket 30. One end of the first fixing piece 71 extends through the mounting slot 351 in the mounting bracket 30. The first fixing piece bent tab 711 abuts against and is secured to the blocking tab 335 of the mounting bracket 30. The mounting bracket 30, together with the first expansion card 70 and the riser card 50, is secured in the chassis 10, and the riser card 50 is engaged in the first connector 21 of the motherboard 20. Thus, the first expansion card 70 is mounted in the chassis 10.

Figure 5:
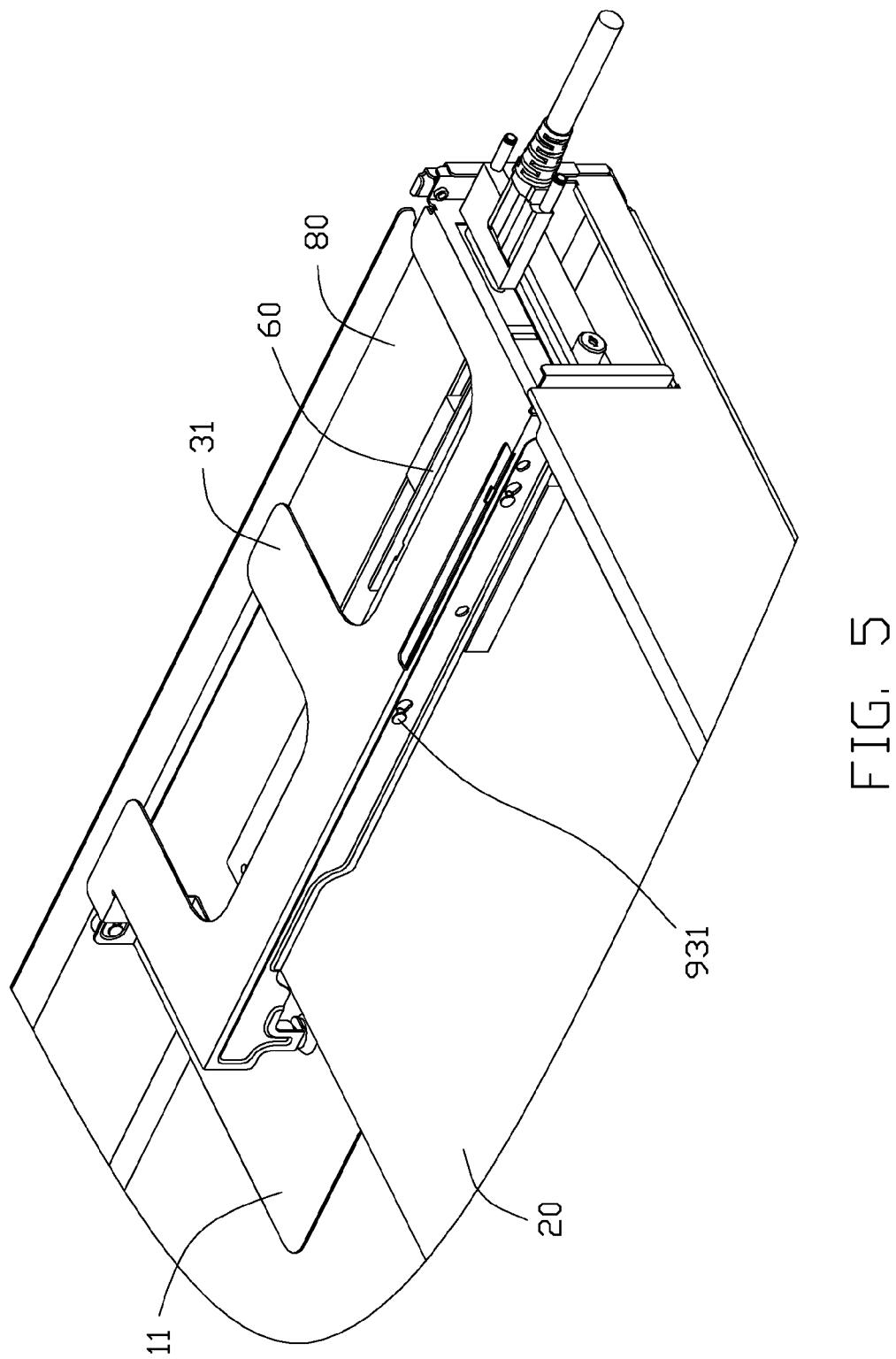
FIG. 5 is an assembled view of FIG. 3.

Referring to FIG. 5, when the second riser card 60 with the second expansion card 80 is selected for mounting in the chassis 10, the second riser card 60 is perpendicularly inserted in the second connector 23 on the motherboard 20. The second expansion card 80 is perpendicularly coupled to the second riser card 60 and parallel to the motherboard 20. The first side plate 93 of the positioning member 90 abuts against the mounting bracket securing plate 35. The securing protrusions 931 on the positioning member 90 engage in the securing slots 355 in the mounting bracket 35. Two fasteners 105 extend through the securing holes 951 in the second side plate 95 and the securing holes 61 in the second riser card 60. Thus, the second riser card 60 is secured to the positioning member 90. Then, one end of the second fixing piece 80 extends through the mounting slot 973 in the positioning member 90. The second fixing piece bent tab 811 abuts against and is secured to the blocking tab 335 of the mounting bracket 30. The mounting bracket 30 together with the second expansion card 90 and the riser card 60 is secured in the chassis 10, and the riser card 60 is engaged in the second connector 23 of the motherboard 20. Thus, the second expansion card 80 is mounted in the chassis 10. The second expansion card 80 and the positioning member cooperatively define a width substantially equal to the width of the first expansion card 70.

According to the above described disclosure, the mounting bracket 30 can be used to optionally mount a first type of expansion card or a second type of expansion card which have different measurements into the chassis 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A computer system, comprising:
   a chassis;
   a motherboard, a first socket arranged on the motherboard, and a riser card inserted in the first socket;
   a mounting bracket secured to the chassis and located above the motherboard; and
   a positioning member separated from the mounting bracket, the positioning member having two opposite side plates substantially parallel to each other, one of the side plates secured to the riser card, and the other side plate secured to the mounting bracket.

2. The computer system of claim 1, wherein the riser card is inserted in the first socket, and an expansion card is perpendicularly coupled to the riser card and parallel to the motherboard.

3. The computer system of claim 1, wherein the mounting bracket defines two securing slots, one of the positioning member side plates forms two securing protrusions, and the securing protrusions engage in the securing slot.

4. The computer system of claim 1, wherein the positioning member comprises a third plate perpendicular to the two opposite side plates, the third plate forms a bridge portion defining a slot; a fixing piece is secured to a second expansion card, the fixing piece abuts the positioning member third plate; and one end of the fixing piece is inserted in the slot and the other end of the fixing piece is secured to the mounting bracket.

5. The computer system of claim 1, wherein a second socket is disposed on the motherboard, the positioning member is located between the first socket and the second socket, and a width of the positioning member is substantially equal to a distance between the first socket and the second socket.

6. The computer system of claim 5, wherein the chassis comprises a sidewall and a front wall, the first socket and the second socket are aligned in a row parallel to the chassis front wall, and the second socket is located further away from the chassis sidewall than the first socket.

7. The computer system of claim 6, wherein the chassis comprises a bottom wall for the motherboard disposed thereon, the mounting bracket comprises a base abutting the expansion card, a sidewall is bent from one end of the base and abuts the chassis front wall, and two standoffs extend from another end of the base opposite to the sidewall, the standoffs are secured to the chassis bottom wall, and the sidewall abuts on and is secured to the chassis front wall.

8. The computer system of claim 7, wherein the expansion card defines a port configured to communicate with a peripheral device, the mounting bracket second sidewall defines an opening corresponding to the port.

9. The computer system of claim 7, wherein the positioning member further comprises a top wall that is substantially perpendicular to the two opposite side plates, and the top wall abuts the base of the mounting bracket.

10. A computer system, comprising:
   a chassis;
   a motherboard secured in the chassis, a first connector and a second connector arranged on the motherboard, the first connector configured to couple with a first riser card which is coupled with a first expansion card, and the second connector configured to couple with a second riser card which is coupled with a second expansion card;
   a mounting bracket secured to the chassis and located above the motherboard; and
   a positioning member located between the first connector and the second connector; the positioning member comprises two opposite side plates;
   wherein one of the first riser card with the first expansion card and the second riser card with the second expansion card is coupled to the first connector or the second connector and secured to the mounting bracket, when the first riser card is selected, the first riser card is inserted into the first connector, and the first expansion card is secured to the mounting bracket; when the second riser card is selected, one of the side plates is secured to the second riser card, and the other side plate is secured to the mounting bracket.

11. The computer system of claim 10, wherein the positioning member is separated from the mounting bracket, and the two opposite side plates are substantially parallel to each other.

12. The computer system of claim 11, wherein the positioning member comprises a third plate, the third plate defines a slot; a fixing piece is secured to the second expansion card, the fixing piece is capable of abutting the positioning member third plate, and one end of the fixing piece is inserted in the slot and the other end of the fixing piece secured to the mounting bracket.

13. The computer system of claim 10, wherein the first expansion card is perpendicular to the first riser card, and the second expansion card is perpendicular to the second riser card.

14. The computer system of claim 13, wherein a width of the first expansion card is substantially equal to a total width of the second expansion card and the positioning member.

15. The computer system of claim 10, wherein the mounting bracket defines two securing slots, and one of the positioning member side plates forms two securing protrusions, each securing protrusion engages one of the securing slots.

16. The computer system of claim 10, wherein the chassis comprises a sidewall and a front wall; the first connector and the second connector are aligned in a row parallel to the chassis front wall, the first connector is located further away from the chassis sidewall than the second connector.

17. The computer system of claim 16, wherein the chassis comprises a bottom wall for the motherboard disposed thereon; the mounting bracket comprises a base abutting one of the first and second expansion cards, a sidewall is bent from one end of the base adjacent to the chassis front wall, and two standoffs extend from another end of the base opposite to the sidewall; and the standoffs are secured to the chassis bottom wall, and the sidewall abuts on and is secured to the chassis front wall.

18. The computer system of claim 17, wherein the first expansion card and the second expansion card each defines a port configured to communicate with a peripheral device, and the mounting bracket second sidewall defines openings corresponding to the ports.

19. The computer system of claim 17, wherein the positioning member further comprises a top wall that is substantially perpendicular to the two opposite side plates, and the top wall abuts the base of the mounting bracket.

* * * * *